US009281756B2

(12) United States Patent
Divan et al.

(10) Patent No.: US 9,281,756 B2
(45) Date of Patent: Mar. 8, 2016

(54) POWER FLOW CONTROLLER WITH A FRACTIONALLY RATED BACK-TO-BACK CONVERTER

(71) Applicant: VARENTEC, INC., San Jose, CA (US)

(72) Inventors: Deepakraj M. Divan, San Jose, CA (US); Rajendra Prasad Kandula, Atlanta, GA (US); Anish Prasai, San Jose, CA (US)

(73) Assignee: VARENTEC, INC., Santa Clara, CA (US)

( * ) Notice: Subject to any disclaimer, the term of this patent is extended or adjusted under 35 U.S.C. 154(b) by 178 days.

(21) Appl. No.: 13/673,966

(22) Filed: Nov. 9, 2012

(65) Prior Publication Data

US 2014/0009980 A1 Jan. 9, 2014

Related U.S. Application Data

(60) Provisional application No. 61/558,706, filed on Nov. 11, 2011.

(51) Int. Cl.
*H02M 5/45* (2006.01)
*H02M 5/458* (2006.01)
*H02J 3/06* (2006.01)
*H02M 1/00* (2007.01)

(52) U.S. Cl.
CPC ............... *H02M 5/4585* (2013.01); *H02J 3/06* (2013.01); *H02M 2001/0093* (2013.01)

(58) Field of Classification Search
CPC . H02M 5/458; H02M 5/4585; H02M 5/4505; H02M 3/33592; H02M 3/33523; H02M 3/3384; H02M 7/217; H02M 7/219; H02M 7/003; H02M 7/537; H02M 7/538; H02M 7/5387; H02M 7/53835; H02M 7/5381; H02M 7/53871; H02M 7/53806
USPC .................. 363/25, 34, 36, 37, 89, 125, 127, 363/131–133; 323/205–211
See application file for complete search history.

(56) References Cited

U.S. PATENT DOCUMENTS 5,469,044 A * 11/1995 Gyugyi et al. ................. 323/207
5,729,444 A * 3/1998 Perol .............................. 363/25

(Continued)

OTHER PUBLICATIONS

IEEE 100. The Authoritative Dictionary of IEEE Standards Terms. 7th ed. 2000. p. 1201.*

*Primary Examiner* — Gary L Laxton
*Assistant Examiner* — Kevin H Sprenger
(74) *Attorney, Agent, or Firm* — Sheppard Mullin Richter & Hampton LLP

(57) ABSTRACT

A power flow controller with a fractionally rated back-to-back (BTB) converter is provided. The power flow controller provide dynamic control of both active and reactive power of a power system. The power flow controller inserts a voltage with controllable magnitude and phase between two AC sources at the same frequency; thereby effecting control of active and reactive power flows between the two AC sources. A transformer may be augmented with a fractionally rated bi-directional Back to Back (BTB) converter. The fractionally rated BTB converter comprises a transformer side converter (TSC), a direct-current (DC) link, and a line side converter (LSC). By controlling the switches of the BTB converter, the effective phase angle between the two AC source voltages may be regulated, and the amplitude of the voltage inserted by the power flow controller may be adjusted with respect to the AC source voltages.

4 Claims, 9 Drawing Sheets

(56) References Cited

U.S. PATENT DOCUMENTS

| | | | |
|---|---|---|---|
| 6,292,379 B1 * | 9/2001 | Edevold et al. | 363/71 |
| 6,411,067 B1 * | 6/2002 | Bjorklund | 323/207 |
| 7,535,738 B2 * | 5/2009 | Wei et al. | 363/71 |
| 7,813,884 B2 * | 10/2010 | Chu et al. | 702/61 |
| 7,990,097 B2 * | 8/2011 | Cheng et al. | 318/800 |
| 8,531,173 B2 * | 9/2013 | Krok et al. | 323/340 |
| 2008/0205093 A1 * | 8/2008 | Davies et al. | 363/35 |
| 2010/0124078 A1 * | 5/2010 | Lu | 363/21.01 |
| 2011/0068757 A1 * | 3/2011 | Xu et al. | 323/271 |
| 2012/0106210 A1 * | 5/2012 | Xu et al. | 363/37 |
| 2012/0120697 A1 * | 5/2012 | Cuk | 363/126 |
| 2013/0063995 A1 * | 3/2013 | Norrga et al. | 363/125 |

* cited by examiner

POWER FLOW CONTROLLER WITH A FRACTIONALLY RATED BACK-TO-BACK CONVERTER

CROSS-REFERENCE TO RELATED APPLICATIONS

This application claims benefit of U.S. Provisional Patent Application No. 61/558,706, filed on Nov. 11, 2011, entitled "Power Flow Controller with a Fractionally Rated Back-to-Back Converter", which is hereby incorporated herein by reference in its entirety.

STATEMENT OF RIGHTS TO INVENTIONS MADE UNDER FEDERALLY SPONSORED RESEARCH

This invention was made with Government support under DE-AR0000108 awarded by the United States Department of Energy. The Government has certain rights in the invention.

TECHNICAL FIELD

The present invention(s) relate generally to controlling power flow in an electric power system. More particularly, the invention(s) relate to power flow controllers with back-to-back converters.

DESCRIPTION OF THE RELATED ART

An electric power system is a network of interconnected electrical equipment that generates, transmits, and consumes electric power. Electric power is delivered to consumers through a transmission network and a distribution network from generators to consumers. The transmission network and the distribution network are often known as the transmission grid and the distribution grid, respectively. Operation of the transmission grid and the distribution grid was once straightforward before the deregulation of the electric power market, but became extremely complex as a result of the competition among various utility companies. Increased amount of electric power is flowing in the electric power system and causing congestion and overflow in certain parts of the electric power system, which may limit the capacity and also impact the reliability of the electric power system. As the electric power system is highly dynamic, real-time power flow control ensures the electric power system's reliability and increases its capacity and efficiency. As a result, the increasing load demand, increasing level of penetration of renewable energy and limited transmission infrastructure investments have significantly increased the need for a smart dynamically controllable grid.

Traditionally, power flow control has been achieved by generator control, shunt VAR compensation and LTC tap settings. However, the range of control achieved is not very significant and the dynamic response is very slow. Various devices can be installed on the electric power system to perform electric power flow controls such as a Phase Angle Regulator (PAR), also known as a Phase Shifting Transformer (PST), a Unified Power Flow Controller (UPFC), and a Back-to-Back (BTB) HVDC link.

PARs or PSTs correct the phase angle difference between two parallel connected electrical transmission systems and thereby control the power flow between the two systems so that each can be loaded to its maximum capacity. Conventional PARs and PSTs insert a series voltage to a phase that is in quadrature with the line-to-neutral voltage. However, conventional PARs or PSTs cannot control the reactive power flow independently from the active power flow. Their dynamic capabilities, if they exist, are also very limited.

UPFCs consist of two inverters with an intermediate DC bus with energy storage. One inverter is connected in shunt through transformer, while the second inserts a series voltage in the line, again through transformer coupling. UPFCs typically can insert a desired series voltage, balancing average power flow using the shunt inverter. This allows a UPFC to source or sink active and reactive power. UPFCs are typically used at very high power and voltage levels (100 MW @ 345 KV). The need for UPFCs to survive faults and abnormal events on the grid makes their design complex and expensive because the series transformers and inverters for operation under system faults are large and expensive. Moreover, the shunt transformer and inverters for operation under transient voltages also add cost. As a result, although UPFCs have been commercially available for decades, few have been deployed.

BTB HVDC links consist of two inverters with an intermediate DC bus with energy storage. BTB HVDC links provide a wide control range (+/−1 p.u.) for both active and reactive power. However, for a 1 p.u. control range, the converter has to be rated for at least 2 p.u. (two converters of 1 p.u. each). Building such high power controllers for transmission or sub-transmission systems is extremely complex and expensive. Also, the size and complexity may affect their reliability. As the two inverters are connected in series, effectively a single point of failure in the system is created.

BRIEF SUMMARY OF EMBODIMENTS OF THE INVENTION

According to various embodiments of the invention, a power flow controller with a fractionally rated back-to-back (BTB) converter is provided. Various embodiments provide dynamic control of both active and reactive power of a power system. The power flow controller inserts a voltage with controllable magnitude and phase between two AC sources; thereby effecting control of active and reactive power flows between the two AC sources. In one embodiment, a transformer is augmented with a fractionally rated bi-directional Back to Back (BTB) converter. In various embodiments, low-rating insulated gate bipolar transistors (IGBTs) are used as switches in the fractionally rated converters. Further, a power flow controller may be isolated from a system fault. In some embodiments, a fail-normal switch bypasses the power flow controller in case of a contingency.

A power flow controller with a fractionally rated BTB converter provides control of both the active and reactive power flow between two AC sources at the same frequency. In various embodiments, the fractionally rated BTB converter comprises a transformer side converter (TSC), a direct-current (DC) link, and a line side converter (LSC). By controlling the switches of the BTB converter, the effective phase angle between the two AC source voltages may be regulated, and the amplitude of the voltage inserted by the power flow controller may be adjusted with respect to the AC source voltages. Various embodiments may be implemented at various voltage levels such as 13 kV, 69 kV, and 139 kV. Further, in some embodiments, a power flow controller comprises a fail-normal switch. As the fault current is diverted by the bypass switch until line breakers trip, the transformer and the BTB converter of the power flow controller are isolated from fault currents or high transient voltages during any fault.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

According to various embodiments of the invention, a power flow controller with a fractionally rated back to back (BTB) converter is provided. Various embodiments provide dynamic control of both active and reactive power of a power system. The power flow controller inserts a voltage with controllable magnitude and phase between two AC sources; thereby effecting control of active and reactive power flows between the two sources. In one embodiment, a transformer is augmented with a fractionally rated bi-directional BTB converter. In various embodiments, switches of the BTB converter may be implemented by low-rating insulated gate bipolar transistors (IGBTs). Further, the power flow controller may comprise a fail-normal switch that bypasses the power flow controller in case of a contingency. As the fault current is diverted by the bypass switch until line breakers trip, the transformer and the BTB converter of the power flow controller are isolated from fault currents or high transient voltages during any fault.

A power flow controller with a BTB converter controls both the active and the reactive power flow between two AC sources at the same frequency. In various embodiments, the fractionally rated BTB converter comprises a transformer side converter (TSC), a direct-current link, and a line side converter (LSC). By controlling the switches in the fractionally rated converter, the effective phase angle between the two voltages may be regulated and the amplitude of the voltage inserted by the power flow controller may be adjusted with respect to the AC source voltages.

Before describing the invention in detail, it is useful to describe a few example environments with which the invention can be implemented. One such example is that of illustrated in FIG. 1.

Figure 1:
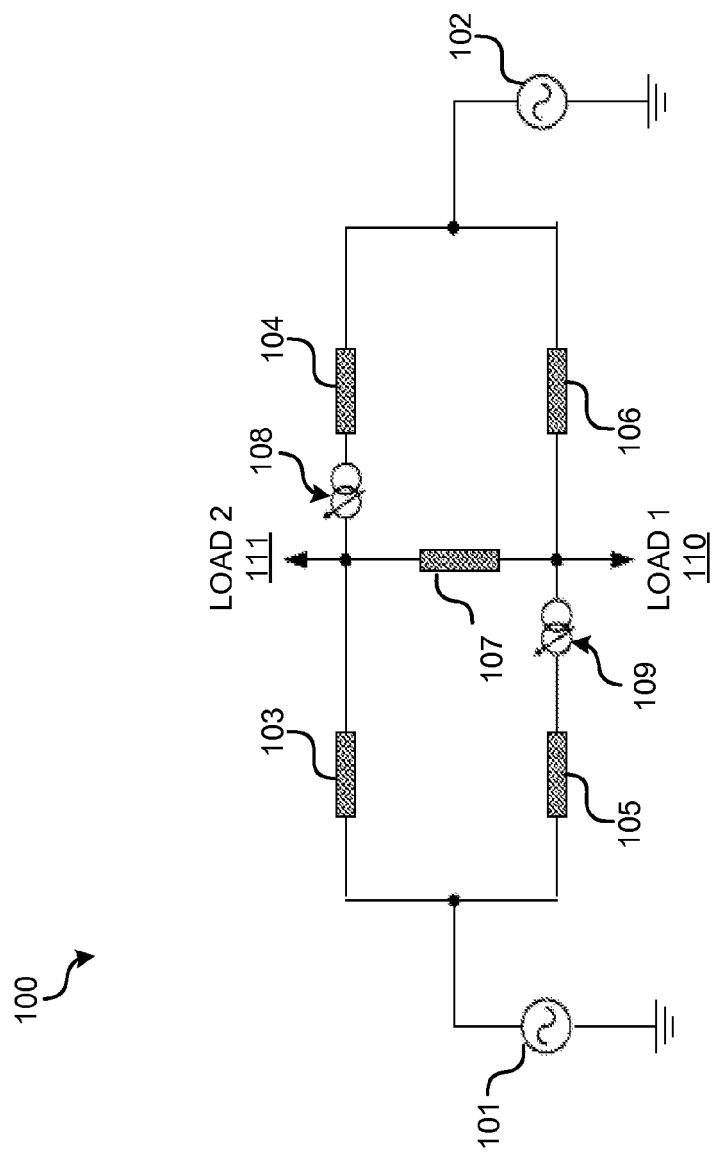
FIG. 1 illustrates an exemplary system diagram of an electric power system where various embodiments of the invention can be implemented.

FIG. 1 illustrates an exemplary system diagram of an electric power system 100 where various embodiments of the invention can be implemented. The electric power system 100 comprises generators 101 and 102; loads 110 and 111; and transmission lines 103-107, which may have different ratings and are loaded differently. Various power flow controllers may be deployed to the power system 100. In the illustrated example, two power flow controllers 108 and 109 are installed. As a result of this installation, power flows of the power system 100 may be controlled. In other words, both the active and reactive power along each transmission line of the power system 100 may be redirected.

From time-to-time, the present invention is described herein in terms of this example environment. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 2:
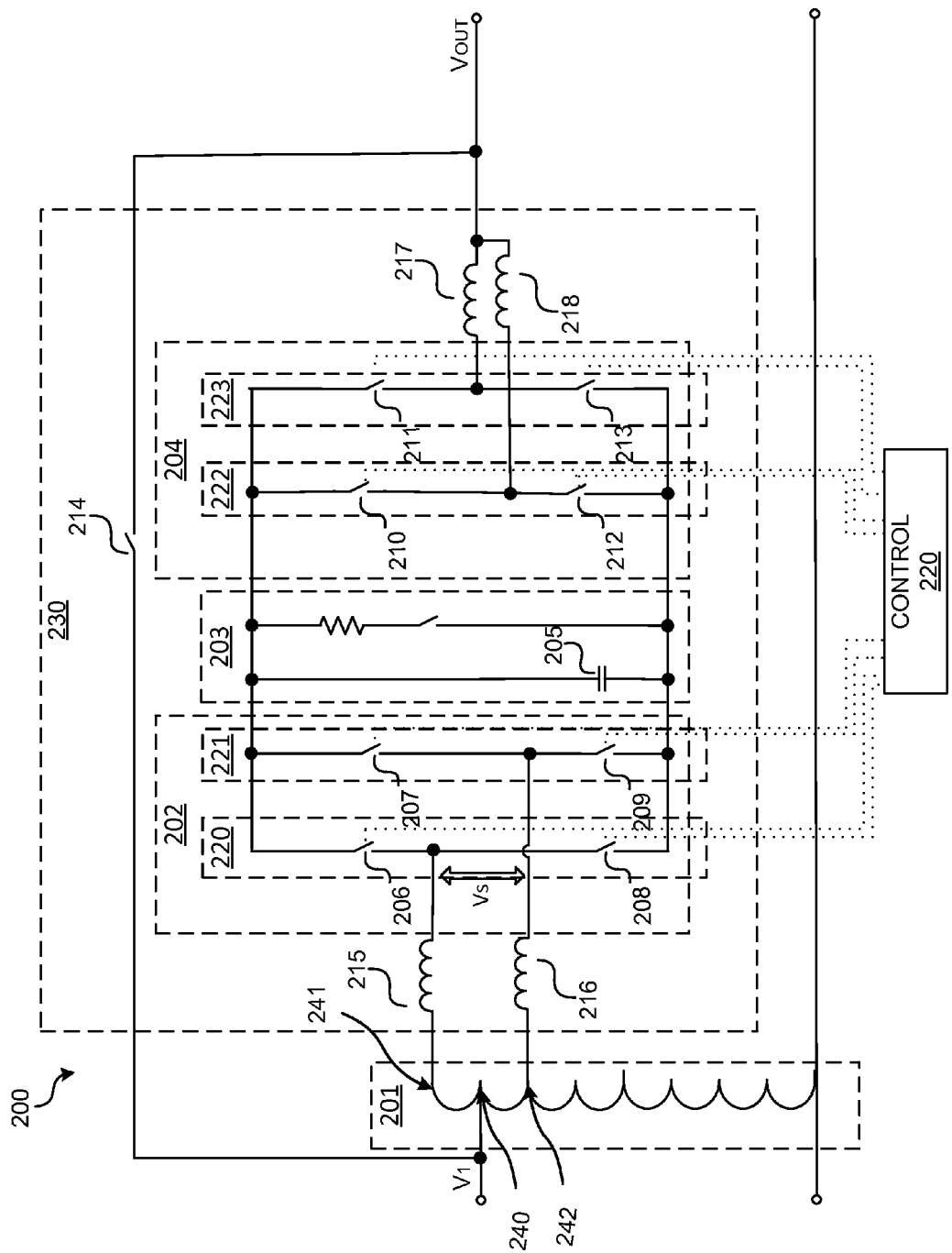
FIG. 2 illustrates an exemplary schematic diagram of a single-phase power flow controller in accordance with an embodiment of the invention.

FIG. 2 illustrates an exemplary schematic diagram of a single-phase power flow controller 200 in accordance with an embodiment of the invention. The example power flow controller 200 comprises a transformer 201 and a BTB converter 230. In one embodiment, the transformer 201 may be an autotransformer. In one embodiment, the transformer 201 may be an isolated step-down transformer. The BTB converter 230 comprises a transformer side converter (TSC) 202 which is an AC-DC converter, a direct-current (DC) link 203, a line side converter (LSC) 204 which is a DC-AC converter, input filter inductors 215 and 216, and output filter inductors 217 and 218. The LSC 204 may be a full-bridge or a half-bridge DC-AC converter. The TSC 202 and the LSC 204 are connected through the common DC link 203. In the illustrated example, the common DC link 203 comprises a capacitor 205 and is a capacitor link. The TSC 202 comprises switches 206-209, and the LSC comprises switches 210-213. The TSC 202 comprises legs 220 and 221: the leg 220 comprises switches 206 and 208, and the leg 221 comprises switches 207 and 209. The legs 220 and 221 of the TSC 202 may be coupled between two taps 241 and 242 of the transformer 201. In one embodiment, the legs 220 and 221 are coupled between taps +/−n of the transformer 201, respectively. Further, the LSC 204 comprises legs 222 and 223: the leg 222 comprises switches 210 and 212 and the leg 223 comprises switches 211 and 213. The legs of the LSC 204 may be both coupled to the output of the BTB converter 230, either directly or indirectly.

The power flow controller 200 may be installed between two AC two sources. In one embodiment, the power flow controller 200 may be installed in series with a transmission line between the two AC sources. In various embodiments, taps of the transformer 201 may be floating around the voltage level of the transmission line where the power flow controller is installed. The input of the power flow controller 200 is connected to one node of a transmission line and the output of the power flow controller 200 is connected to another node of the transmission line. In various embodiments, the mid-point of the BTB converter 230 may serve as the input of the power flow controller 200. In further embodiments, the tap 240 of the transformer 201 may serve as the input of the power flow controller 200. Taps of the transformer 201 may be floating around the voltage level at the tap 240 of the transformer 201, which may be the line voltage. The legs 220 and 221 of the TSC 202 may be coupled between taps 241 and 242 of the transformer 201, respectively, either directly or indirectly. The tap 240 may be a tap that is located between the taps 241 and 242. In one embodiment, the taps 241 and 242 are +/−n of the transformer 201, and the tap 240 is the center tap of the tap winding (i.e., +/−n) of the transformer 201. In various embodiments, the output of the power flow controller 200 is the output of the BTB converter 230. The output of the power flow controller 200 is coupled to another node of the transmission line.

The control module 220 regulates the switches 206-213. In various embodiments, the control module 220 may generate switching pulses to regulate the turn-on and turn-off of each switch. In some embodiments, the control module 220 may interact with the gate drivers for switches 206-213. In various embodiments, the switches 206-213 are two-quadrant switches that conduct currents in both directions but may block voltages in one direction. In some embodiments, insulated-gate bipolar transistors (IGBTs) with an antiparallel diode or metal-oxide-semiconductor field-effect transistor (MOSFETs) with an antiparallel diode may be used as switches 206-213. An ordinary skill in the art should appreciate that switches 206-213 may be implemented by other devices.

Further, the power flow controller 200 may comprise a fail-normal switch 214. The fail-normal switch 214 may be connected across the BTB converter 230. In one embodiment, the fail-normal switch 214 may be coupled to the tap 240 of the transformer 201. In various embodiments, the fail-normal switch 214 may be realized by two anti-parallel thyristors. In further embodiments, the fail-normal switch 214 may be realized by electromechanical or vacuum switches in parallel with the thyristors. The fail-normal switch 214 provides fast response. In cases of a converter failure or a line side fault, the fail-normal switch 214 turns on and bypasses the transformer 201 and the BTB converter 230 of the power flow controller 200, which avoids single-point failures and increases the system reliability. As system faults may result in currents of the order of 10-20 kA for duration of 5-10 cycles before being interrupted by protective mechanism. When a fault is detected, the BTB converter 230 is switched off and the fail-normal switch 214 is turned on such that the fault current flows through the fail-normal switch 214. The DC capacitor 205 of the BTB converter 230 only needs to handle the fault current for a short delay (10-20 micro seconds) between the fault detection and the fail-normal switch turn on time. In some embodiments where the transformer 201 is a load tap changing (LTC) transformer, the fail-normal switch 214 retains the passive transformer functionality.

The BTB converter 230 is a fractionally rated BTB converter as the input voltage $V_S$ of the BTB converter 230 is a fraction of the line voltage $V_1$. For example, the input voltage $V_S$ of the BTB converter 230 may be less than 10% of the rated voltage of the transformer 201. In various embodiments, the BTB converter 230 may be coupled between +/−10% taps of the transformer 201. In turn, the rating of the BTB converter 230 is only a fraction (e.g., equal or less than 10%) of the total controlled power rating as the switches 206-213 handle only a fraction of the transformer 201 rated voltage. Since the BTB converter 230 achieves the fractional rating because of the fractional voltage rather than the current, multi-level converter may be implemented in various embodiments where series operation of the switches cannot be avoided.

Figure 3:
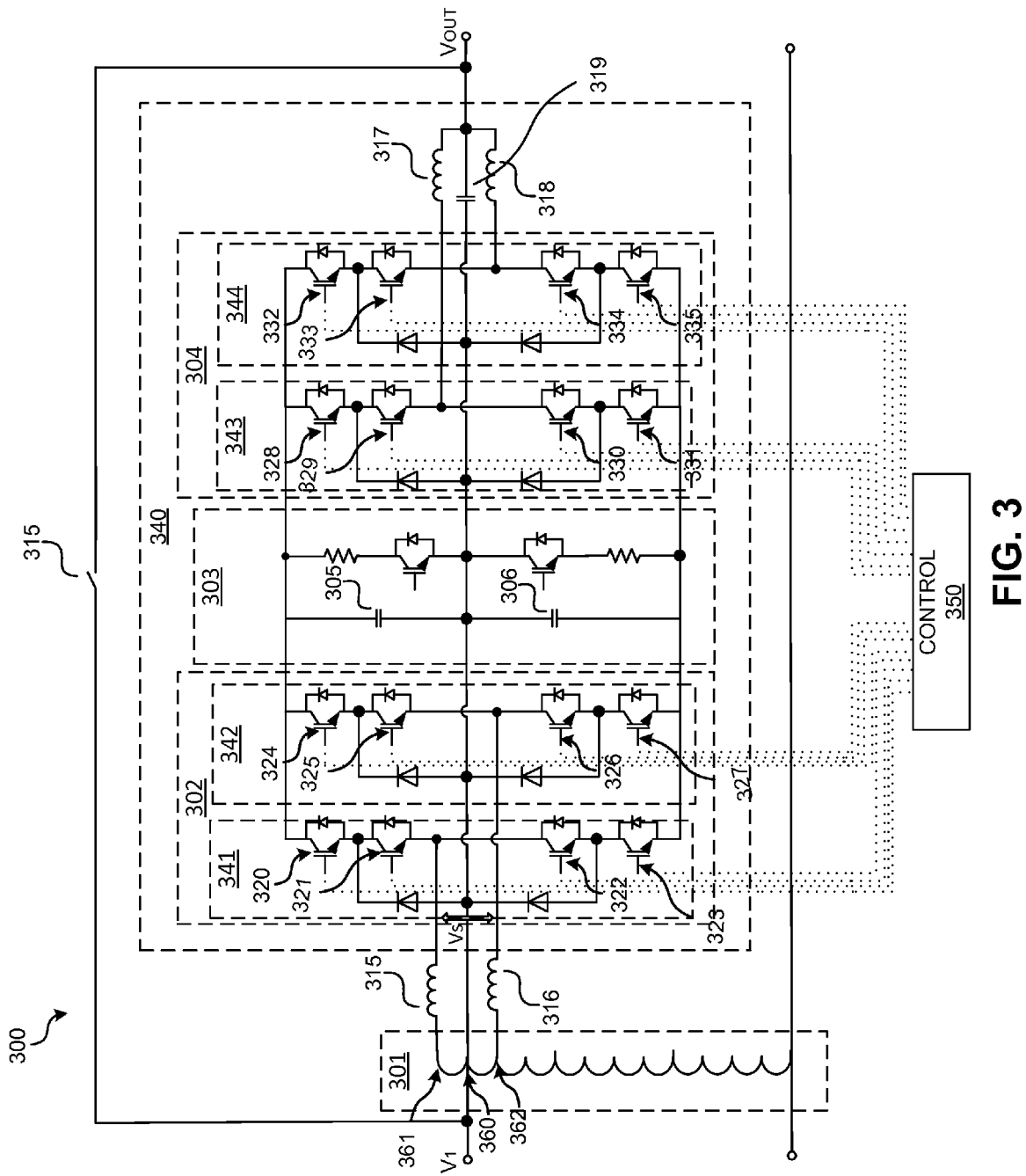
FIG. 3 illustrates an exemplary schematic diagram of a single-phase 3-level power flow controller in accordance with an embodiment of the invention.

FIG. 3 illustrates an exemplary schematic diagram of a single-phase 3-level power flow controller 300 in accordance with an embodiment of the invention. The example power flow controller 300 comprises a transformer 301 and a 3-level BTB converter 340. In one embodiment, the transformer 301 may be an autotransformer. In one embodiment, the transformer 301 may be an isolated step-down transformer. The BTB converter 340 comprises a transformer side converter (TSC) 302 which is an AC-DC converter, a direct-current (DC) link 303, a line side converter (LSC) 304 which is a DC-AC converter, input filter inductors 315-316, and output filter inductors 317-318 and capacitor 319. In various embodiments, the LSC 304 may be a full-bridge or a half-bridge DC-AC inverter. The TSC 302 and the LSC 304 are coupled through the common DC link 303. In the illustrated example, the common DC link 303 is a capacitor link comprising two capacitors 305 and 306. The TSC 302 comprises switches 320-327 and the LSC comprises switches 328-335. The TSC 302 comprises legs 341 and 342: the leg 341 comprises switches 320-323 and the leg 342 comprises switches 324-327. The legs 341 and 342 of the TSC 302 may be coupled between two taps of the transformer 301. The legs 341 and 342 of the TSC 302 may be coupled between the taps +/−n of the transformer 301, respectively. Further, the LSC 304 comprises legs 343 and 344: the leg 343 comprises switches 328-331 and the leg 344 comprises switches 332-335. The legs of the LSC 304 may be coupled to the output of the BTB converter 340, either directly or indirectly.

The power flow controller 300 may be installed between two AC two sources. The power flow controller 300 may be connected in series with a transmission line. In various embodiments, taps of the transformer 301 may be floating around the voltage level of the transmission line where the power flow controller is installed. The input of the power flow controller 300 is connected to one node of a transmission line and the output of the power flow controller 300 is connected to another node of the transmission line. In various embodiments, the mid-point of the BTB converter 340 may serve as the input of the power flow controller 300. In further embodiments, the tap 360 of the transformer 301 may serve as the input of the power flow controller 300. Taps of the transformer 301 may be floating around the voltage level at the tap 360 of the transformer 301, which may be the line voltage. The legs 341 and 342 of the TSC 302 may be coupled between taps 361 and 362 of the transformer 301, respectively, either directly or indirectly. The tap 360 may be a tap that is located between the taps 361 and 362. In one embodiment, the taps 361 and 362 are +/−n of the transformer 301, and the tap 360 is the center tap of the tap winding (i.e., +/−n) of the transformer 301. As illustrated, the tap 360 of the transformer 301 may be connected to the mid-point of the LSC 304. In one embodiment, the center tap of the tap winding of the transformer 301 may be connected to mid-point of the LSC 304 to reduce the loss of the multiple-level BTB converter 340 including the switching/conduction and passive losses and to reduce overheating of the capacitors comprised in the DC link as this neutral line allows current to flow directly from the input of the BTB converter to the output of the BTB converter. In various embodiments, the output of the power flow controller 300 is the output of the BTB converter 340. The output of the power flow controller 300 is coupled to another node of the transmission line.

The BTB converter 340 is a fractionally rated BTB converter as the input voltage $V_S$ of the BTB converter 340 is a fraction of the line voltage $V_1$. For example, the input voltage $V_S$ of the BTB converter 340 may be less than 10% of the rated voltage of the transformer 301. In various embodiments, the BTB converter 340 is connected between +/−10% taps of the transformer 301. In turn, the rating of the BTB converter 340 is only a fraction (e.g., equal or less than 10%) of the total controlled power rating as the switches 320-335 handle only a fraction of the transformer 301 rated voltage.

Still referring to FIG. 3, the control module 350 regulates the switches 320-335. In various embodiments, the control module 350 may generate switching pulses to regulate the turn-on and turn-off of each switch. In some embodiments, the control module 350 may interact with the gate drivers for switches 320-335. In the illustrated example, the switches 320-335 are two-quadrant switches that are implemented by an IGBT and an anti-parallel diode. In some embodiments, metal-oxide-semiconductor field-effect transistor (MOSFETs) with an antiparallel diode may be used as switches 320-335. An ordinary skill in the art would appreciate that switches 320-335 may be implemented by other devices.

Further, the power flow controller 300 may comprise a fail-normal switch 315. The fail-normal switch 315 may be connected across the BTB converter 340. In one embodiment, the fail-normal switch 315 may be coupled to the tap 360 of the transformer 301. In various embodiments, the fail-normal switch 315 is realized by two anti-parallel thyristors. In further embodiments, the fail-normal switch 315 may be realized by electromechanical or vacuum switches in parallel with the thyristors. The fail-normal switch 315 provides fast response. In cases of a converter failure or a line side fault, the fail-normal switch 315 turns on and bypasses the transformer 301 and the BTB converter 340 of the power flow controller 300, which avoids single-point failures and increases the system reliability. As system faults may result in currents of the order of 10-20 kA for duration of 5-10 cycles before being interrupted by protective mechanism. When a fault is detected, the BTB converter 340 is switched off and the fail-normal switch 315 is turned on such that the fault current flows through the fail-normal switch 315. The DC capacitors 305-306 of the BTB converter 340 only need to handle the fault current for a short delay (10-20 micro seconds) between the fault detection and the fail-normal switch turn on time. In some embodiments where the transformer 301 is a load tap changing (LTC) transformer, the fail-normal switch 315 retains the passive transformer functionality.

Figures 4A, 4B:
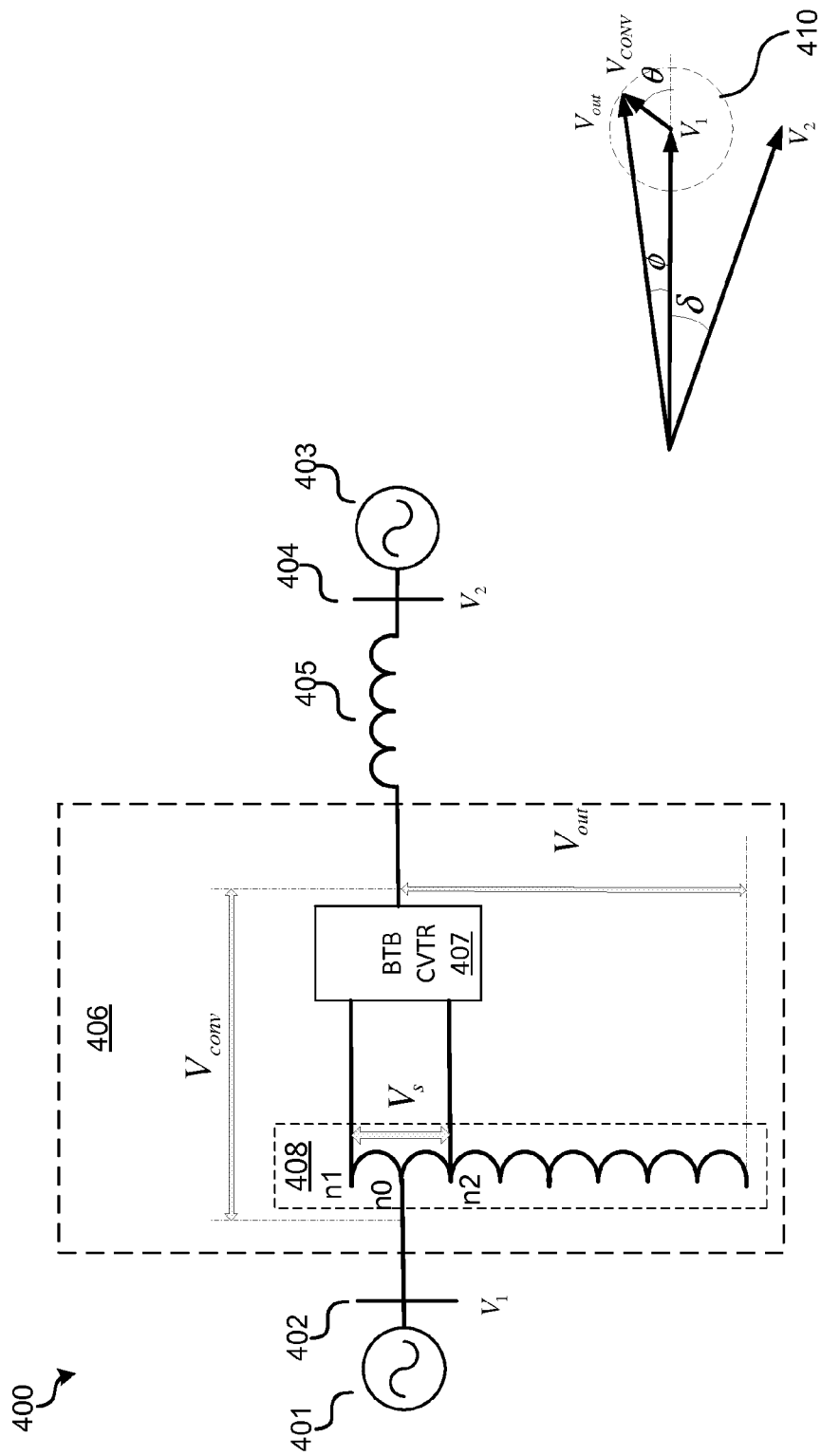
FIG. 4A is a diagram illustrating a system with an installation of a power flow controller in accordance with an embodiment of the invention.
FIG. 4B is a vector diagram illustrating principles of operation of a power flow controller in accordance with an embodiment of the invention.

FIGS. 4A and 4B illustrate principles of operation of various embodiments of the power flow controllers with BTB converters as described herein. FIG. 4A is a diagram illustrating a system with an installation of a power flow controller 406 in accordance with an embodiment of the power flow controllers with BTB converters as described herein. FIG. 4B is a vector diagram illustrating principles of operation of a power flow controller in accordance with an embodiment of the invention. The exemplary system 400 comprises two generators 401 and 403, two buses 402 and 404, and a transmission line 405. $V_1$ is the voltage at Bus 402, and $V_2$ is the voltage at Bus 404. In the illustrate example, the power flow controller 406 is installed in series with the transmission line 405. The power flow controller 406 performs dynamic power flow control of both active and reactive power of the power system 400. Such dynamic power flow control is achieved by actively controlling the phase and magnitude of the transfer voltage in a certain range. The BTB converter 407 synthesizes the converter input voltage $V_S$ to generate a voltage $V_{CONV}$ that may be of different magnitude and phase compared to $V_S$. As a result, the phase and magnitude of the output voltage $V_{out}$, resultant of Bus 1 Voltage $V_1$ and $V_{CONV}$, may be controlled to achieve both active and reactive power control.

Referring to FIG. 4B, as illustrated, the initial phase difference between bus 402 voltage $V_1$ and bus 404 voltage $V_2$ is δ. The power flow controller 406 inserts a voltage $V_{CONV}$ to $V_1$, which creates the output voltage $V_{out}$. The output voltage $V_{out}$ and the Bus 402 voltage $V_1$ may have different phases and amplitudes. The amplitude of the output voltage $V_{out}$ may be adjusted by adjusting the amplitude and phase angle of the inserted voltage $V_{CONV}$. Further, the phase difference between the output voltage $V_{out}$ and the Bus 404 voltage $V_2$ is (δ+ϕ), which may be adjusted by adjusting the amplitude and phase angle of the inserted voltage $V_{CONV}$. As such, control of both active power and reactive power is achieved as the active power transferred between buses 402 and 404

$$(P = \frac{V_{out}V_2}{X_{Line}}\sin(\delta + \phi),$$

where $X_{Line}$ is the line impedance) is a function of (δ+ϕ), and the reactive power transferred between buses 402 and 404

$$(Q = \frac{V_{out}V_2}{X_{Line}}\left(\cos(\delta + \phi) - \frac{V_{out}}{V_1}\right),$$

where $X_{Line}$ is the line impedance) is a function of the voltage amplitude $V_{out}$ and $V_2$.

The series voltage $V_{CONV}$ that the power flow controller can generate is a function of the input voltage $V_S$, which in turn depends on the transformer taps across which the BTB converter is connected. As shown, the range of the voltage $V_{CONV}$ is a circle 410 with a radius of $$\frac{V_S}{2}.$$

The power flow control range of the power flow controller is a function of the input voltage $V_S$, line impedance $X_{Line}$, and the phase difference δ between the sending end voltage $V_1$ and the receiving end voltage $V_2$. The active power P, the sending end reactive power at Bus 402 $Q_1$, and the receiving end reactive power at Bus 404 $Q_2$ may be expressed in Equations (1), (2), and (3) respectively:

$$P = \frac{V_{out}V_2}{X}\sin(\delta + \phi) \tag{1}$$

$$Q_1 = \frac{V_{out}}{X}(V_{out} - V_2\cos(\delta + \phi)) \tag{2}$$

$$Q_2 = \frac{V_{out}}{X}(V_2 - V_{out}\cos(\delta + \phi)) \tag{3}$$

where $V_{out} = \sqrt{V_1^2 + V_{CONV}^2}$ $\phi = \tan^{-1}\frac{V_{CONV}\sin\theta}{V_1 + V_{CONV}\cos\theta}$ Further, referring back to FIG. 4A, the power flow controller 406 also has shunt VAR capability. The shunt VAR range is the same as the BTB converter 407 rating. The range of the shunt VAR is given in Equation (4):

$$Q_{SHUNT} = 2n*\sqrt{3}*V_{Bus}*I_{CONV\_rating} \quad (4)$$

where $V_{Bus}$ is the line-to-line voltage, n is the transformer tap ratio, and $I_{CONV\_rating}$ is the current rating of the BTB converter.

As illustrated, various embodiments have circular range of operation. For a converter with input voltage $V_S$ and the DC link voltage $V_{DC}$, the fundamental voltage that the converter may synthesize is given by Equation (5):

$$V_{CONV} = \frac{V_{S,PEAK} V_{DC}}{2} (k_q \sin\theta + k_p \cos\theta) \text{ such that} \quad (5)$$

$$\sqrt{(k_q - 0.5)^2 + k_p^2} < 0.5$$

where $V_{S,PEAK}$ is the peak voltage of the converter input voltage, $k_q$ is the reactive power coefficient, and $k_p$ is the active power coefficient.

The in-phase component $k_q \sin\theta$ of the converter voltage controls the reactive power flowing through the line where the power flow controller is deployed while the out of phase component $k_p \cos\theta$ controls the active power.

Figure 5B:
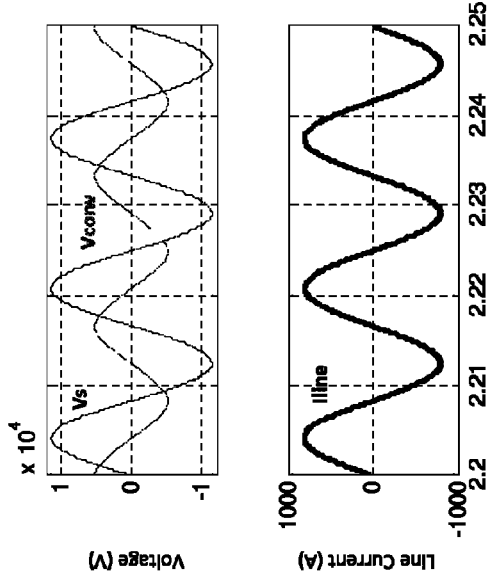
FIGS. 5A-C illustrate simulation waveforms of an embodiment of the invention as described herein.
Figure 5A:
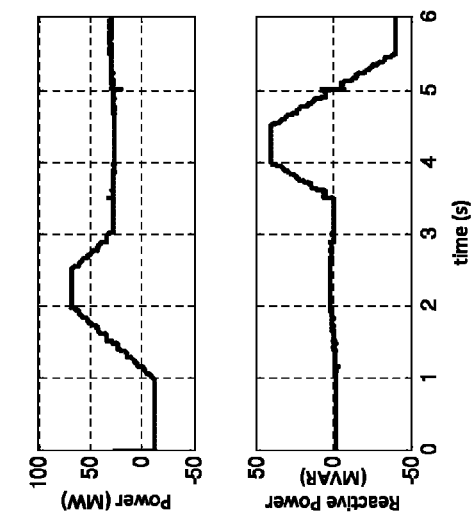
Figure 5C:
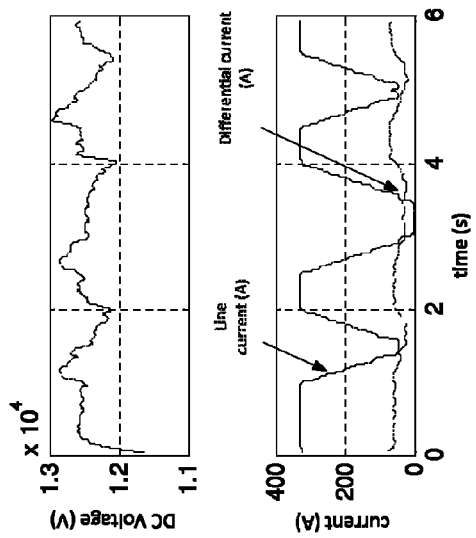

FIGS. 5A-C illustrate simulation waveforms of an embodiment of the invention as described herein. One embodiment of a power flow controller is simulated in a 2-bus 138 kV system with parameters shown in Table 1. The converter parameters are given in Table 2. The control parameters are designed using standard bode plot techniques and are given in Table 3.

TABLE 1

138 kV Test System Parameters

| Parameter | Value |
|---|---|
| Voltage | 138 kV L-L, 80 kV L-G |
| Line | 30 miles, 0.168 + j0.79 ohms/mile |
| Taps (n) | +/−5% |

TABLE 2

Converter Parameters

| Parameter | Value |
|---|---|
| $V_S$ | 8.0 kV |
| $V_{DC}$ | 12.5 kV |
| $C_{DC}$ | 1 mF |
| $L_{diff}$ | 4 mH |
| $L_f$ | 1 mH |
| $C_f$ | 50 microF |
| Δ | 2 degrees |

TABLE 3

Converter Control Parameters

| Parameter | Value |
|---|---|
| Differential Mode | |
| $V_{DC}$ (base) | 12.5 kV |
| $I_{diff}$ (base) | 500A |
| $K_p k_i$ (voltage loop) | 4, 10 respectively |
| $K_p k_i$ (current loop) | 0.05, 0.5 respectively |

TABLE 3-continued

Converter Control Parameters

| Parameter | Value |
|---|---|
| Common Mode | |
| $V_{CONV}$ (base) | 4 kV |
| $I_{line}$ (base) | 800A |
| $K_p k_i$ | 0.1, 0.5 respectively |

Referring to FIG. 5A, when δ is 2 degrees, the power flow in the line without the power flow controller is 28 MW. The power flow controller may vary power flow from 66 MW to −10 MW, thereby providing a control range of 38 MW while maintaining the reactive power constant. Referring to FIG. 5B, the converter input voltage $V_S$, line current and converter voltage $V_{CONV}$ at maximum active power range are shown. The maximum $V_{CONV}$ that the converter can generate $$\frac{V_S}{2}.$$

Referring to FIG. 5C, the differential current being controlled to regulate the DC bus voltage is shown. A controllability range of +/−38 MW/MVAR is achieved with a converter rating of 10% of the power being controlled. As the converter is connected between +/−5% taps, the converter only handles peak voltage of 12 kV.

Figure 6A:
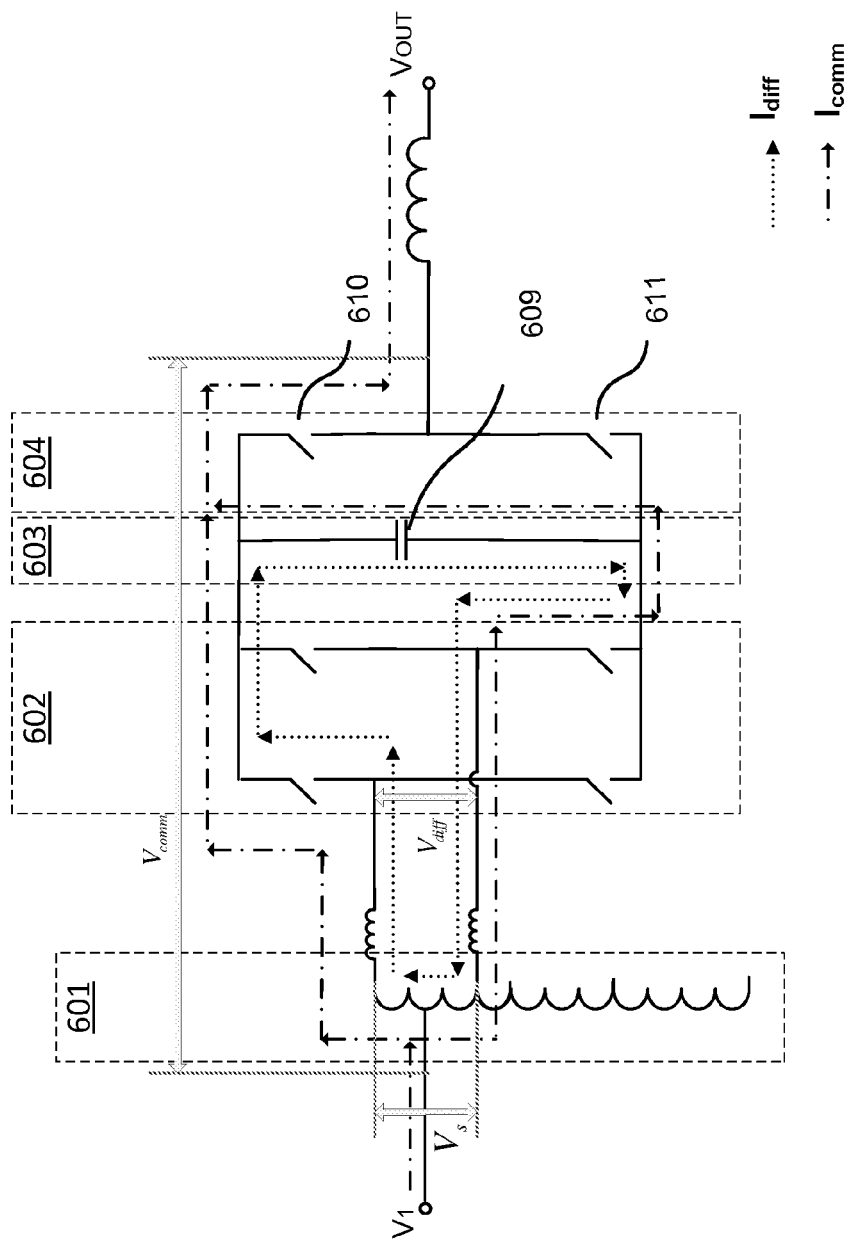
FIG. 6A depicts common mode and differential mode controls implemented in various embodiments of the invention as described herein.
Figure 6B:
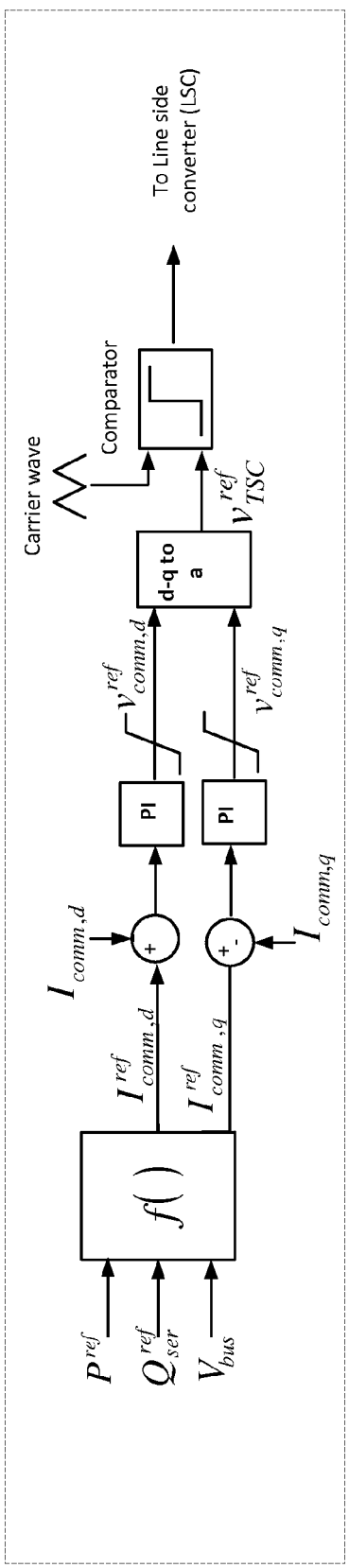
FIG. 6B-D illustrate control block diagrams of various embodiments of the invention as described herein.
Figure 6C:
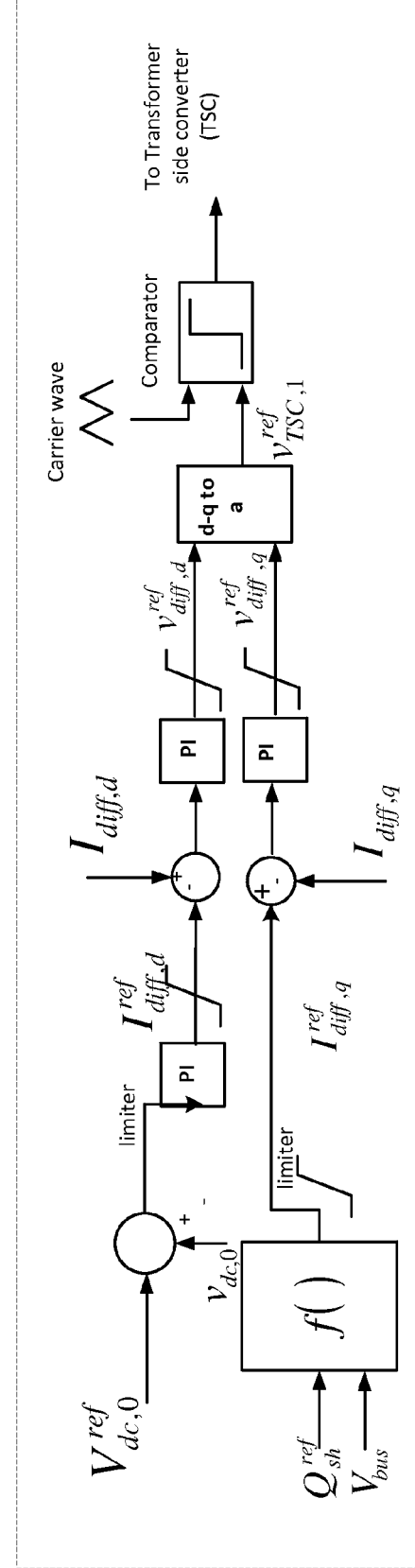
Figure 7:
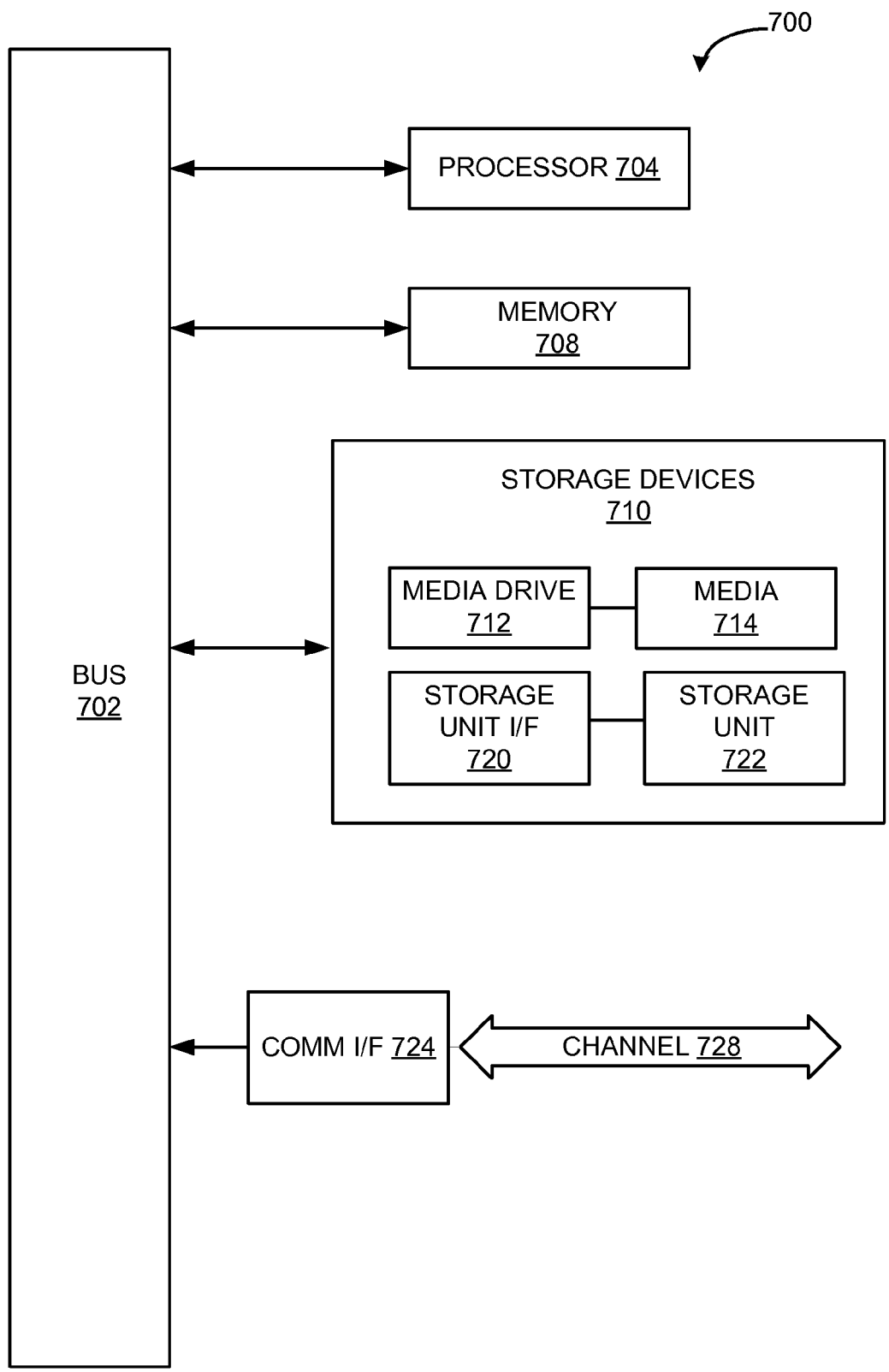
FIG. 7 illustrates an example computing module that may be used in implementing various features of embodiments of the invention.

FIGS. 6A-C depict the control block diagrams in various embodiments of the invention, which may be implemented by a computing module as illustrated in FIG. 7. FIG. 6A depicts the common mode and differential mode control in various embodiments of the invention as described herein. In the illustrated example, the LSC 604 is a half-bridge DC-AC converter. In various embodiments, the power flow in the power flow controller comprises two components: a common mode and a differential mode. The common mode is the primary component controlling the line current while the differential component is used for auxiliary purposes such as controlling the DC link 603 voltage.

The common mode power is controlled by the LSC 604 to generate requisite power flow in the line. The common mode converter voltage $V_{Comm}$ is regulated controlled to regulate the common mode current $I_{Comm}$, which is the same as the line current. The LSC 604 may generate either $$\frac{V_S + V_{DC}}{2} \text{ or } \frac{V_S - V_{DC}}{2}$$

depending on the status of the switches 610 and 611 of the LSC 604. Any voltage waveform that remains within the range of $$\frac{V_S + V_{DC}}{2} \text{ and } \frac{V_S - V_{DC}}{2}$$

may be synthesized by regulating the duty cycle of the switches 610 and 611 of the LSC 604. Accordingly, the maximum fundamental voltage that may be generated by the converter with respect to the center tap of the transformer 601 has a peak voltage of $$\frac{V_{DC}}{2}.$$

In some embodiments, $V_{DC}$ is controlled to be the peak of $V_S$.

The differential power component shuffles energy between the transformer 601 and the DC bus through the TSC 602. The active component of the differential mode current $I_{Diff}$ is controlled to regulate the mean DC capacitor 609 voltage and the reactive component is controlled to regulate the shunt VAR of the power flow controller.

Figure 6D:
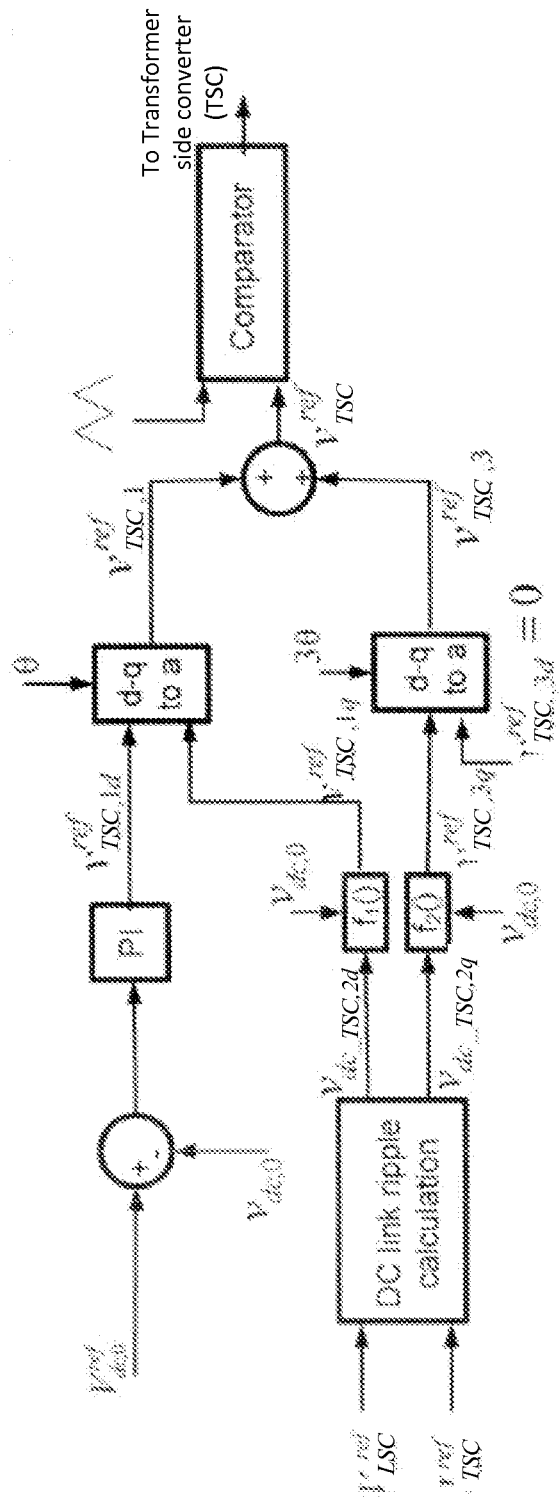

FIGS. 6B-D illustrate the control block diagrams in various embodiments of the invention as described herein. The control schemes comprise a common mode control scheme and a differential mode control scheme, which may be implemented by various control modules of different embodiments, for example, the control module 220 as illustrated in FIG. 2 and the control module 350 as illustrated in FIG. 3.

FIG. 6B illustrates the common mode control block diagram in various embodiments of the invention as described herein. In one embodiment, the common mode control is realized in a current loop. For desired active power and series VAR control, in various embodiments, the control module sets the current references for the common mode control. The control is achieved in d-q synchronous reference frame. The desired line currents $I_{comm}^{ref}$ are compared with the actual current $I_{comm}$, and the error is propagated through the PI controller, which in turn generates converter output voltage $V_{comm}^{ref}$. The reference voltage is then compared with the carrier wave to generate switching pulses for the LSC of a power flow controller.

FIG. 6C illustrates a differential mode control block diagram in various embodiments of the invention as described herein. In one embodiment, the common mode control is realized in a voltage loop as the objective of the differential mode control is to maintain the average DC link voltage $V_{DC,0}$ at a desired value and also control the shunt VAR. The average value of the DC link voltage is extracted with a low pass filter and then compared with the reference value. The voltage error is fed to the PI regulator which in turn generates the TSC reference current $I_{diff,d}^{ref}$. The control generates the reference for the reactive component of the differential current $I_{diff,q}^{ref}$, as per the shunt VAR requirements. The differential currents are regulated by generating appropriate switching pulses for the TSC of a power flow controller.

FIG. 6D illustrates a differential mode control block diagram in various embodiments of the invention as described herein. In various embodiments, the reactive power flow across the capacitor of the DC link may introduce low frequency ripples such as a $2^{nd}$ harmonic voltage ripple across the capacitor. By achieving power balance between input and output of the converter, the low frequency ripples and the capacitor size may be minimized. Instantaneous power balance between the input and the output of the BTB converter of a power flow controller may be achieved by introducing controlled harmonics, for example, $3^{rd}$ and $5^{th}$ harmonic in the input side of the BTB converter, thereby minimizing instantaneous power imbalance on either side of the converter. The input power available at the harmonic frequency together with the available power at the fundamental frequency will try to balance the fundamental power required on the output of the converter at each instant. In various embodiments, the DC link capacitor may be reduced by this control scheme. As the induced harmonics on the input are controlled, the peak currents through the switches of the BTB converter are limited. Further, no harmonics are induced in the line current.

As illustrated, the in-phase component $V_{dc\_LSC,2d}$ and the out-of-phase component $V_{dc\_LSC,2q}$ of the $2^{nd}$ harmonic ripple flowing through the DC link of a BTB converter caused by the common mode current may be determined from the current $I_{LSC}$ and the voltage $V_{LSC}$ of the LSC of a BTB converter. The in-phase component $V_{dc\_LSC,2d}$ may be compensated by the differential mode reactive current component which in turn is controlled by the q-axis TSC voltage $V_{TSC,1q}$. The out-of-phase component $V_{dc\_LSC,1q}$ may be compensated by the $3^{rd}$ harmonic current in the differential mode, which is controlled by the $3^{rd}$ harmonic voltage $V_{TSC,3q}$ of the TSC. The fundamental and the $3^{rd}$ harmonic reference voltages are summed up and compared with the carrier wave to generate switching pulses for the TSC of a BTB converter. In various embodiments, the carrier wave is a pulse-width modulation (PWM) carrier wave.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the invention using other computing modules or architectures.

Referring now to FIG. 7, computing module 700 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of controlling a back-to-back converter comprised in a power flow controller for controlling power flow between a first AC source and a second AC source, wherein the back-to-back converter comprises an AC-DC converter, a DC link, and a DC-AC converter, comprising:
   detecting an actual common mode current and an actual differential mode current;
   calculating a reference common mode current and a reference differential mode current, wherein the step of calculating the reference common mode current uses a provided reference active power, reference series reactive power, and reference bus voltage;
   generating a common mode back-to-back converter output voltage reference and a differential mode back-to-back converter output voltage reference; and
   generating a first set of switching pulses for the DC-AC converter and a second set of switching pulses for the AC-DC converter.

2. The method of claim 1, further comprising providing a reference DC link voltage and a reference shunt reactive power, wherein the step of calculating the reference differential current uses the reference DC link voltage and the reference shunt reactive power.

3. The method of claim 1, wherein the step of generating the common mode back-to-back converter output voltage reference and the differential mode back-to-back converter output voltage reference compares the actual common mode current to the reference common mode current and the actual differential mode current to the reference differential mode current.

4. A method of controlling a back-to-back converter comprised in a power flow controller for controlling power flow between a first AC source and a second AC source, wherein the back-to-back converter comprises an AC-DC converter, a DC link, and a DC-AC converter, comprising:
   detecting an actual common mode current and an actual differential mode current;
   calculating a reference common mode current and a reference differential mode current
   generating a common mode back-to-back converter output voltage reference and a differential mode back-to-back converter output voltage reference; and
   generating a first set of switching pulses for the DC-AC converter and a second set of switching pulses for the AC-DC converter, wherein the step of generating the first set of switching pulses for the DC-AC converter and the second set of switching pulses for the AC-DC converter compares the common mode back-to-back converter output voltage reference with a carrier wave and a sum of fundamental and third harmonic reference voltages with the carrier wave.

* * * * *